(12) United States Patent
Chae (10) Patent No.: US 12,198,713 B2
(45) Date of Patent: Jan. 14, 2025

(54) LEARNING METHOD FOR GENERATING LIP SYNC IMAGE BASED ON MACHINE LEARNING AND LIP SYNC IMAGE GENERATION DEVICE FOR PERFORMING SAME

(71) Applicant: DEEPBRAIN AI INC., Seoul (KR)

(72) Inventor: Gyeong Su Chae, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 0 days.

(21) Appl. No.: 17/764,314

(22) PCT Filed: Jun. 17, 2021

(86) PCT No.: PCT/KR2021/007643
§ 371 (c)(1),
(2) Date: Mar. 28, 2022

(87) PCT Pub. No.: WO2022/255529
PCT Pub. Date: Dec. 8, 2022

(65) Prior Publication Data
US 2024/0055015 A1 Feb. 15, 2024

(30) Foreign Application Priority Data
Jun. 3, 2021 (KR) .......................... 10-2021-0071994

(51) Int. Cl.
*G10L 21/10* (2013.01)
*G10L 19/00* (2013.01)
(Continued)

(52) U.S. Cl.
CPC .......... *G10L 21/10* (2013.01); *G10L 19/0018* (2013.01); *G10L 25/30* (2013.01); *G10L 25/57* (2013.01); *G10L 2021/105* (2013.01)

(58) Field of Classification Search
CPC .......... G10L 21/10; G10L 19/00; G10L 25/30; G10L 25/57
See application file for complete search history.

(56) References Cited

U.S. PATENT DOCUMENTS 11,581,020 B1 * 2/2023 Hadap .................. G11B 27/036
11,582,519 B1 * 2/2023 Bhat ..................... H04N 21/466
(Continued)

FOREIGN PATENT DOCUMENTS

| JP | 2008-148084 A | 6/2008 |
|----|---------------|--------|
| KR | 10-0300962 B1 | 10/2001 |
| KR | 10-2002-0022504 A | 3/2002 |

OTHER PUBLICATIONS

K R Prajwal et al, 'A Lip Sync Expert Is All You Need for Speech to Lip Generation in the Wild', arXiv:2008.10010, Aug. 2020, pp. 1-10.

(Continued)

*Primary Examiner* — Richemond Dorvil
*Assistant Examiner* — Ethan Daniel Kim
(74) *Attorney, Agent, or Firm* — The PL Law Group, PLLC (57) ABSTRACT

A lip sync image generation device based on machine learning according to a disclosed embodiment includes an image synthesis model, which is an artificial neural network model, and which uses a person background image and an utterance audio signal as an input to generate a lip sync image, and a lip sync discrimination model, which is an artificial neural network model, and which discriminates the degree of match between the lip sync image generated by the image synthesis model and the utterance audio signal input to the image synthesis model.

13 Claims, 8 Drawing Sheets

(51) Int. Cl.
*G10L 25/30* (2013.01)
*G10L 25/57* (2013.01)

(56) References Cited

U.S. PATENT DOCUMENTS

| | | |
|---|---|---|
| 2006/0139490 A1 | 6/2006 | Fekkes et al. |
| 2021/0142783 A1* | 5/2021 | Kim .................. G10L 13/08 |
| 2022/0019855 A1* | 1/2022 | Chen .................. G06K 9/62 |
| 2022/0277760 A1* | 9/2022 | Park .................. G10L 21/01 |
| 2023/0042654 A1* | 2/2023 | Zhang ................ H04N 21/43 |

OTHER PUBLICATIONS

Konstantinos Vougioukas et al., "Realistic Speech-Driven Facial Animation with GANs", International Journal of Computer Vision 128, pp. 1398-1413, https://doi.org/10.1007/s11263-019-01251-8.

Hao Zhu et al., "Arbitrary talking face generation via attentional audio-visual coherence learning", arXiv:1812.06589v2, [cs.CV], May 13, 2020.

Prajwal K R et al.,"Towards Automatic Face-to-Face Translation", MM '19, Session 3C: Smart Applications, Oct. 2019, pp. 1428-1436.

\* cited by examiner

LEARNING METHOD FOR GENERATING LIP SYNC IMAGE BASED ON MACHINE LEARNING AND LIP SYNC IMAGE GENERATION DEVICE FOR PERFORMING SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/007643, filed Jun. 17, 2021, which claims priority to the benefit of Korean Patent Application No. 10-2021-0071994 filed on Jun. 3, 2021 the entirety the entire contents of which are incorporated herein by reference.

BACKGROUND

1. Technical Field

Embodiments of the present invention relate to a lip sync image generation technology.

2. Background Art

In order to learn an artificial neural network model (lip sync model) which synthesizes a lip sync image, a video in which an utterance image and a voice are synchronized is used as training data. That is, both a lip sync model for a single speaker and a lip sync model for multiple speakers are basically based on the same person, and at the same time, learning is performed by using a pair of a captured face and a recorded voice as training data.

The main goal of the lip sync model for a single speaker is to synthesize a lip sync image such that an utterance portion of an arbitrary video whose timing does not match with that of a voice matches the timing of the corresponding voice, but there is a problem in that it is difficult to learn about a case in which the timing of a voice and the timing of an image do not match.

That is, each person has a unique utterance habit. For example, when a speaker has regular or irregular utterance habits associated with the position or movement of the face, such as tilting or nodding the head, the angle of the head, the shape of a shoulder, or the like of a person background image in which an utterance portion is covered becomes the basis for predicting the shape of the mouth, which affects the result of lip sync synthesis, so that the greater the discrepancy between a voice and the person background image when synthesizing a lip sync image, the less the accuracy of lip sync image synthesis.

In addition, the main goal of the lip sync model for multiple speakers is to synthesize a lip sync image even when the timing of a voice and the timing of an utterance image do not match and even when the identity of a person does not match the identity of a person of the voice and the utterance image, but there is a problem in that it is difficult to learn about a case in which the identity of a person does not match the identity of a person of the voice and the utterance image.

That is, each person has a unique tone (e.g., a specific frequency at the time of utterance, a combination of a bass sound and a background sound having relative energy, the intensity, rate of change, or the like at which a sound starts, continues, and ends) and utterance habits, and in the case of different languages, there is a difference in the characteristics of sounds constituting a word. Therefore, when synthesizing a lip sync image of a specific person, if another person's voice or the corresponding person's voice speaking in another language is used as an input, the accuracy of the speaker's mouth shape in the synthesized lip sync image is greatly reduced.

SUMMARY

Embodiments of the present invention is to provide a lip sync image generation technique capable of learning a lip sync model even when a voice and an image do not match.

A lip sync image generation device according to a disclosed embodiment is a lip sync image generation device based on machine learning, wherein the device includes an image synthesis model, which is an artificial neural network model, and which uses a person background image and an utterance audio signal as an input to generate a lip sync image, and a lip sync discrimination model, which is an artificial neural network model, and which discriminates the degree of match between the lip sync image generated by the image synthesis model and the utterance audio signal input to the image synthesis model.

The lip sync image generation device may perform training of the image synthesis model and the lip sync discrimination model by using different total loss functions respectively for a case in which a pair of a person background image and an utterance audio signal matching each other is used as training data and a case in which a pair of a person background image and an utterance audio signal not matching each other is used as training data.

When a pair of a person background image and an utterance audio signal matching each other is input to the image synthesis model, the lip sync image generation device may use reconstruction loss for minimizing the difference between the lip sync image output from the image synthesis model and an original image as a main loss function, and may use sync loss for minimizing the difference between the lip sync image and the utterance audio signal input to the image synthesis model in the lip sync discrimination model as an auxiliary loss function.

A total loss function $L_{agree}$ of the lip sync image generation device may be represented by the following equation.

$$L_{agree} = \Sigma_i \{\|S_i - G(S_i^{mask}, A_i)\| - \lambda_{agree} \cdot D_{sync}(G(S_i^{mask}, A_i), A_i)\} \quad \text{(Equation)}$$

$S_i$: Original image for i-th training data
G: Neural network constituting image synthesis model
$S_i^{mask}$: Person background image in which portion associated with utterance is covered by mask
$A_i$: Utterance audio signal matching person background image
$G(S_i^{mask}, A_i)$: Lip sync image output from image synthesis model
$\|A-B\|$: Function for obtaining difference between A and B
$\lambda_{agree}$: Weight between reconstruction loss of image synthesis model and sync loss of lip sync discrimination model
$D_{sync}$: Neural network constituting lip sync discrimination model The lip sync image generation device may further include an image discriminator model, which is an artificial neural network model, and which classifies the original image as True and classifies the lip sync image as Fake, wherein the lip sync image generation device may include an adversarial loss function which induces the image synthesis model such that the image discriminator model classifies the lip sync image output from the image synthesis model as True.

A total loss function $L_{agree}$ of the lip sync image generation device may be represented by the following equation.

$$L_{agree} = \Sigma_i \{\|S_i - G(S_i^{mask}, A_i)\| - \lambda_{agree} \cdot D_{sync}(G(S_i^{mask}, A_i), A_i) - \gamma \cdot D_{gan}(G(S_i^{mask}, A_i))\}$$ (Equation)

γ: Weight of adversarial loss function
$D_{gan}$: Neural network of image discriminator model The lip sync image generation device may further include an identity discriminator model, which is an artificial neural network model, and which discriminates whether a person of the lip sync image and a person of the original image are the same person, wherein the lip sync image generation device includes an identity loss for minimizing the difference between the identity of the person in the lip sync image and the identity of the person in the original image as a loss function.

A total loss function $L_{agree}$ of the lip sync image generation device may be represented by the following equation.

$$L_{agree} = \Sigma_i \{\|S_i - G(S_i^{mask}, A_i)\| - \lambda_{agree} \cdot D_{sync}(G(S_i^{mask}, A_i), A_i) + \beta \cdot \|D_{id}(S_i) - D_{id}(G(S_i^{mask}, A_i))\|\}$$ (Equation)

β: Weight of identity loss
$D_{id}$ Neural network constituting identity discriminator model When a pair of a person background image and an utterance audio signal not matching each other is input to the image synthesis model, the lip sync image generation device may use sync loss for minimizing the difference between the lip sync image and the utterance audio signal input to the image synthesis model in the lip sync discrimination model as main loss function, and may use partial reconstruction loss for minimizing the difference between the lip sync image output from the image synthesis model and a portion not associated with an utterance in the original image as an auxiliary loss function.

A total loss function $L_{disagree}$ of the lip sync image generation device may be represented by the following equation.

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\|\}$$ (Equation)

$D_{sync}$: Neural network constituting lip sync discrimination model
G: Neural network constituting image synthesis model
$S_i^{mask}$: Person background image in which portion associated with utterance is covered by mask
$A_j$: Utterance audio signal not matching person background image
$G(S_i^{mask}, A_j)$: Lip sync image output from image synthesis model
$\lambda_{disagree}$: Weight between sync loss of lip sync discrimination model and partial reconstruction loss of image synthesis model
$M_i$: Mask for covering portion associated with utterance in person background image
*: Operator for performing pixel-wise multiplication The lip sync image generation device may further include an image discriminator model, which is an artificial neural network model, and which classifies the original image as True and classifies the lip sync image as Fake, wherein the lip sync image generation device may include an adversarial loss function which induces the image synthesis model such that the image discriminator model classifies the lip sync image output from the image synthesis model as True.

A total loss function $L_{disagree}$ of the lip sync image generation device may be represented by the following equation.

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\| - \gamma \cdot D_{gan}(G(S_i^{mask}, A_j))\}$$ (Equation)

γ: Weight of adversarial loss function
$D_{gan}$: Neural network of image discriminator model The lip sync image generation device may further include an identity discriminator model, which is an artificial neural network model, and which discriminates whether a person of the lip sync image and a person of the original image are the same person, wherein the lip sync image generation device includes an identity loss for minimizing the difference between the identity of the person in the lip sync image and the identity of the person in the original image as a loss function.

A total loss function $L_{disagree}$ of the lip sync image generation device may be represented by the following equation.

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\| + \beta \cdot \|D_{id}(S_i) - D_{id}(G(S_i^{mask}, A_j))\|\}$$ (Equation)

β: Weight of identity loss
$D_{id}$: Neural network constituting identity discriminator model A method for generating a lip sync image based on machine learning according to a disclosed embodiment is a method performed in a computing device having one or more processors and a memory which stores one or more programs executed by the one or more processors, wherein the method includes inputting a person background image and an utterance audio signal to an image synthesis model to generate a lip sync image, discriminating, through a lip sync discrimination model, the degree of match between the lip sync image generated by the image synthesis model and the utterance audio signal input to the image synthesis model, and performing training of the image synthesis model and the lip sync discrimination model by using different total loss functions respectively for a case in which a pair of a person background image and an utterance audio signal matching each other is used as training data and a case in which a pair of a person background image and an utterance audio signal not matching each other is used as training data.

According to a disclosed embodiment, when a person background image and an utterance audio signal do not match each other, a lip sync discrimination model is used to add sync loss to a total loss function, so that it is possible to learn a lip sync image output from an image synthesis model, and to improve the synthesis accuracy of the lip sync image.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only illustrative, and the present invention is not limited thereto.

In describing embodiments of the present invention, when a specific description of known technology associated with the present invention is deemed to make the gist of the present invention unnecessarily vague, the detailed description thereof will be omitted. The terms used below are defined in consideration of functions in the present invention, but may vary in accordance with the customary practice or the intention of a user or an operator. Therefore, the terms should be defined based on whole content throughout the present specification. The terms used herein are only for describing the embodiments of the present invention, and should not be construed as limited. A singular expression includes a plural meaning unless clearly used otherwise. In the present description, expressions such as "include" or "have" are for referring to certain characteristics, numbers, steps, operations, components, and some or combinations thereof, and should not be construed as excluding the presence or possibility of one or more other characteristics, numbers, steps, operations, components, and some or combinations thereof besides those described.

Furthermore, the terms "first," "second," and the like may be used for describing various elements, but the elements should not be construed as being limited by the terms. These terms may be used for distinguishing one element from another element. For example, a first element could be termed a second element and vice versa without departing from the scope of the present invention.

Figure 1:
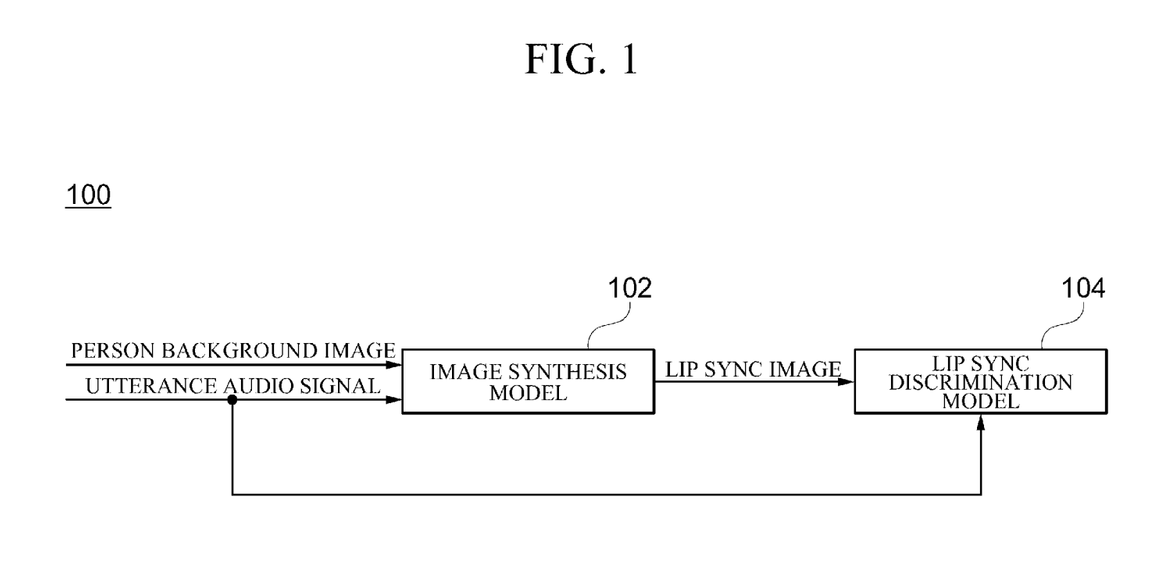
FIG. 1 is a view showing the configuration of a lip sync image generation device according to an embodiment of the present invention.

FIG. 1 is a view showing the configuration of a lip sync image generation device according to an embodiment of the present invention.

Referring to FIG. 1, a lip sync image generation device 100 includes an image synthesis model 102 and a lip sync discrimination model 104. Here, the lip sync image generation device 100 is a lip sync image generation device based on machine learning.

The image synthesis model 102 is an artificial neural network model for synthesizing a lip sync image. In an example embodiment, the image synthesis model 102 may be implemented by a convolutional neural network (CNN)-based machine learning technology, but the machine learning technology is not limited thereto, and other various machine learning technologies may be applied.

The image synthesis model 102 may be provided to synthesize a lip sync image by using a person background image and an utterance audio signal as an input. Here, the image synthesis model 102 may be trained for each of a case in which the person background image and the utterance audio signal match and a case in which the person background image and the utterance audio signal do not match. That is, as training data for training the image synthesis model 102, a pair of a person background image and an utterance audio signal matching each other and a pair of a person background image and an utterance audio signal not matching each other may be used.

When a person background image and an utterance audio signal match, it may mean a case in which the utterance audio signal is the voice of a person in the person background image (i.e., identities match), and the timing of the person background image and the timing of the utterance audio signal match. In addition, when a person background image and an utterance audio signal do not match, it may mean a case in which at least one of the timing between the person background image and the audio signal and the identity between the person background image and the audio signal does not match.

The lip sync discrimination model 104 is an artificial neural network model for discriminating the degree of match (i.e., sync) between the lip sync image output from the image synthesis model 102 and the utterance audio signal (i.e., the utterance audio signal input to the image synthesis model 102 for the generation of a lip sync image) input to the image synthesis model 102.

The lip sync image generation device 100 may perform training of the image synthesis model 102 and the lip sync discrimination model 104 by using different loss functions respectively for a case in which a pair of a person background image and an utterance audio signal matching each other is used as training data and a case in which a pair of a person background image and an utterance audio signal not matching each other is used as training data.

Specifically, when a pair of a person background image and an utterance audio signal matching each other is input to the image synthesis model 102, the lip sync image generation device 100 may use reconstruction loss for minimizing the difference between the lip sync image output from the image synthesis model 102 and an original image (i.e., a correct image) as a main loss function. In addition, sync loss for minimizing the difference between the lip sync image output from the image synthesis model 102 and the utterance audio signal input to the image synthesis model 102 in the lip sync discrimination model 104 may be used as an auxiliary loss function. However, the embodiment is not limited thereto, and only the reconstruction loss may be used as a loss function.

In addition, when a pair of a person background image and an utterance audio signal not matching each other is input to the image synthesis model 102, the lip sync image generation device 100, the lip sync image generation device 100 may use sync loss for minimizing the difference between the lip sync image output from the image synthesis model 102 and the utterance audio signal input to the image synthesis model 102 in the lip sync discrimination model 104 as a main loss function. In addition, partial reconstruction loss for minimizing the difference between the lip sync image output from the image synthesis model 102 and a portion not associated with an utterance in the original image may be used as an auxiliary loss function.

According to a disclosed embodiment, when a person background image and an utterance audio signal do not match each other, the lip sync discrimination model 104 may be used to add sync loss to a total loss function, so that it is possible to learn a lip sync image output from an image synthesis model 102, and to improve the synthesis accuracy of the lip sync image.

Figure 2:
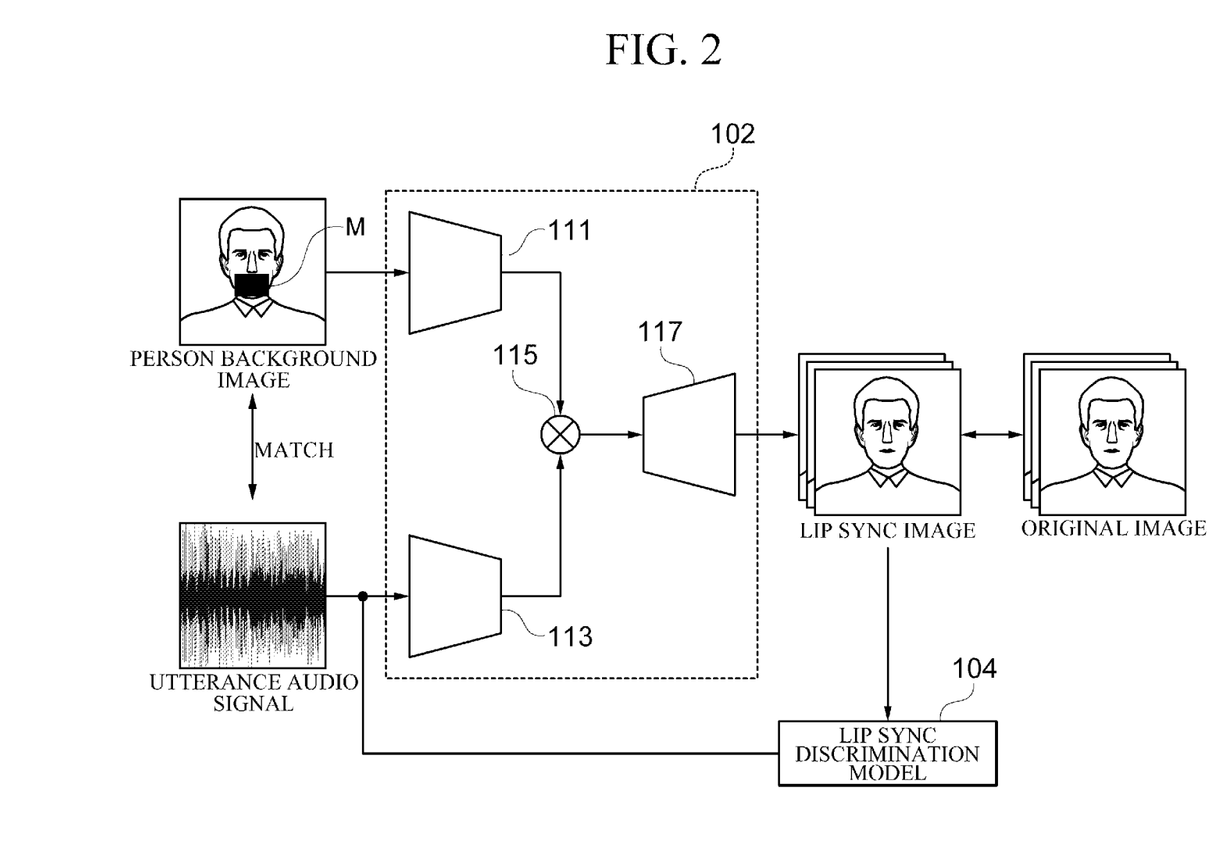
FIG. 2 is a view showing a case in which a pair of a person background image and an utterance audio signal matching each other is used as training data in a lip sync image generation device according to an embodiment of the present invention.

FIG. 2 is a view showing a case in which a pair of a person background image and an utterance audio signal matching each other is used as training data in a lip sync image generation device according to an embodiment of the present invention. Referring to FIG. 2, the image synthesis model 102 may include a first encoder 111, a second encoder 113, a combiner 115, and a decoder 117.

The first encoder 111 may use the person background image as an input to extract an image feature vector. The second encoder 113 may use the utterance audio signal as an input to extract a voice feature vector.

Here, the person background image is an image in which a predetermined person utters (speaks). The person background image may be an image in which a portion associated with an utterance (e.g., a mouth and portions around the mouth) is covered by a mask M. In addition, the utterance audio signal is the voice of a person in the person background image, and is an audio signal whose timing matches the timing of the person background image.

The combiner 115 may combine the image feature vector output from the first encoder 111 and the voice feature vector output from the second encoder 113 to generate a combined vector. The decoder 117 may use the combined vector generated by the combiner 115 as an input to output a lip sync image. The decoder 117 may reconstruct a portion covered by the mask M (i.e., a portion associated with an utterance) of the image feature vector output from the first encoder 111 to generate the lip sync image.

The image synthesis model 102 may use reconstruction loss, which is the difference between the lip sync image output from the decoder 117 and an original image, as a loss function for a corresponding neural network.

In addition, the lip sync discrimination model 104 may be provided to use an utterance audio signal (i.e., an utterance audio signal matching the person background image) as an input and use the lip sync image output from the image synthesis model 102 as an input, in order to obtain the difference between the lip sync image and the utterance audio signal (i.e., the degree of mismatch). That is, the lip sync discrimination model 104 may use sync loss, which is the difference between the lip sync image and the utterance audio signal, as a loss function for a corresponding neural network.

As such, when a pair of a person background image and an utterance audio signal matching each other is used as training data, the lip sync image generation device 100 may minimize the reconstruction loss of the image synthesis model 102 and the sync loss of the sync determination model 104. That is, the image synthesis model 102 may be trained to reduce the difference between the lip sync image and the original image, and the lip sync discrimination model 104 may be trained to reduce the difference between the lip sync image and the utterance audio signal used in the lip sync image.

At this time, a total loss function $L_{agree}$ of the lip sync image generation device 100 may be represented by Equation 1 below.

$$L_{agree} = \Sigma_i \{\|S_i - G(S_i^{mask}, A_i)\| - \lambda_{agree} \cdot D_{sync}(G(S_i^{mask}, A_i), A_i)\} \quad \text{(Equation 1)}$$

$S_i$: Original image for i-th training data
G: Neural network constituting image synthesis model
$S_i^{mask}$: Person background image in which portion associated with utterance is covered by mask
$A_i$: Utterance audio signal matching person background image
$G(S_i^{mask}, A_i)$: Lip sync image output from image synthesis model
$\|A-B\|$: Function for obtaining difference between A and B
$\lambda_{agree}$: Weight between reconstruction loss of image synthesis model and sync loss of lip sync discrimination model
$D_{sync}$: Neural network constituting lip sync discrimination model Here, as the $\|A-B\|$ (i.e., a function for obtaining the difference between A and B), for example, a function obtaining the Euclidean distance (L2 distance) or the Manhattan distance (L1 distance) of A and B may be used.

In Equation 1, the first term of the right side is a term representing the reconstruction loss of the image synthesis model 102, and the second term of the right side is a term representing the sync loss of the lip sync discrimination model 104.

Figure 3:
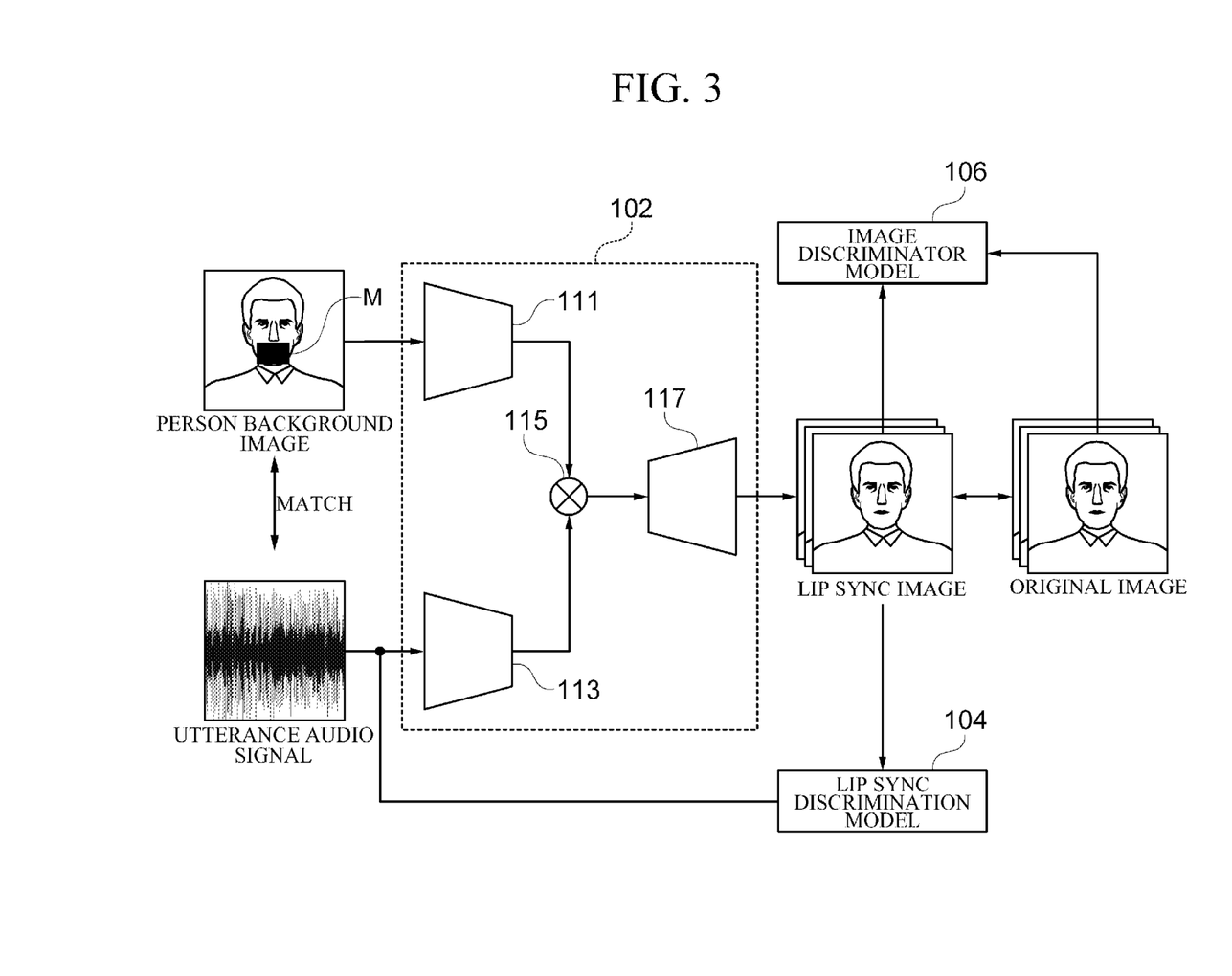
FIG. 3 is a view showing a state in which an image discriminator model is added in a lip sync image generation device of FIG. 2.

Meanwhile, as illustrated in FIG. 3, the lip sync image generation device 100 may further include an image discriminator model 106 for improving the realism and quality of the lip sync image output from the image synthesis model 102. The image discriminator model 106 may be an artificial neural network model which is trained to classify the original image as True and classify the lip sync image output from the image synthesis model 102 as Fake.

Here, the image synthesis model 102 and the image discriminator model 106 may form a generative adversarial network. That is, the image synthesis model 102 may correspond to a generator in the generative adversarial network, and the image discriminator model 106 may correspond to a discriminator in the generative adversarial network.

The lip sync image generation device 100 may train the image discriminator model 106 to determine the lip sync image output from the image synthesis model 102 as True. In this case, the lip sync image generation device 100 may include an adversarial loss function which induces the image synthesis model 102 such that the image discriminator model 106 classifies the lip sync image output from the image synthesis model 102 as True.

At this time, a total loss function $L_{agree}$ of the lip sync image generation device 100 may be represented by Equation 2 below.

$$L_{agree} = \Sigma_i \{\|S_i - G(S_i^{mask}, A_i)\| - \lambda_{agree} \cdot D_{sync}(G(S_i^{mask}, A_i), A_i) - \gamma \cdot D_{gan}(G(S_i^{mask}, A_i))\} \quad \text{(Equation 2)}$$

$\gamma$: Weight of adversarial loss function
$D_{gan}$: Neural network of image discriminator model In Equation 2, the first term of the right side is a term representing the reconstruction loss of the image synthesis model 102, the second term of the right side is a term representing the sync loss of the lip sync discrimination model 104, and the third term of the right side is a term representing the adversarial loss function by the image discriminator model 106.

Figure 4:
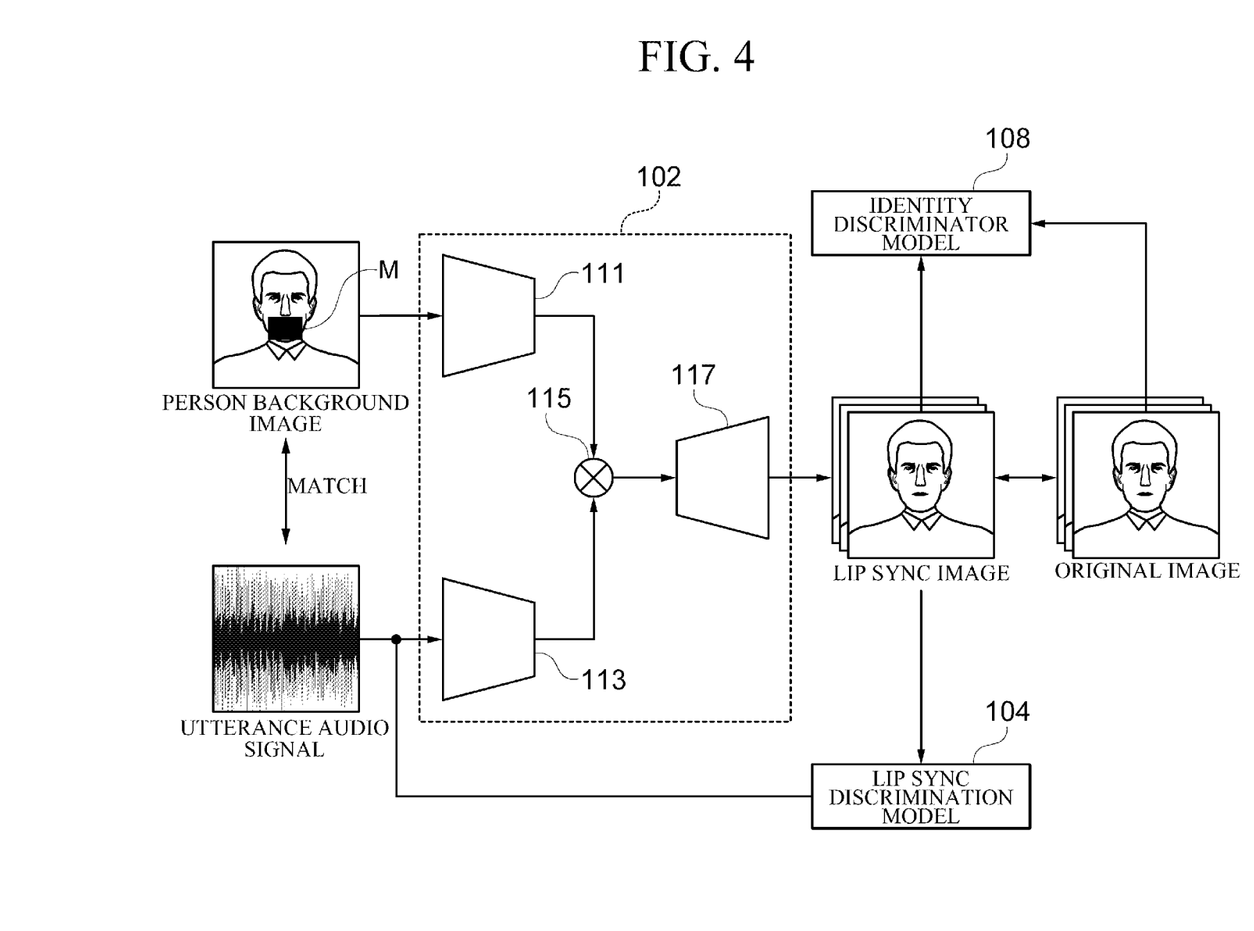
FIG. 4 is a view showing a state in which an identity discriminator model is added in a lip sync image generation device of FIG. 2.

In addition, as illustrated in FIG. 4, the lip sync image generation device 100 may further include an identity discriminator model 108 for reinforcing the identity of the lip sync image output from the image synthesis model 102. Particularly, when it is a multi-speaker model, the identity discriminator model 108 may be added to reinforce the identity of the lip sync image. The identity discriminator model 108 may be an artificial neural network model for discriminating whether a person of the lip sync image and a person of the original image are the same person.

The identity discriminator model 108 may be provided to obtain the difference between the identity of the person in the lip sync image output from the image synthesis model 102 and the identity of the person in the original image. That is, the identity discriminator model 108 may use identity loss, which is the difference between the identity of the person in the lip sync image and the identity of the person in the original image, as a loss function of a corresponding neural network.

The total loss function $L_{agree}$ of the lip sync image generation device 100 may include the identity loss in addition to the reconstruction loss and the sync loss. This may be represented by Equation 3.

$$L_{agree} = \Sigma_i \{ \|S_i - G(S_i^{mask}, A_i)\| - \lambda_{agree} \cdot D_{sync}(G(S_i^{mask}, A_i), A_i) + \beta \cdot \|D_{id}(S_i) - D_{id}(G(S_i^{mask}, A_i))\| \} \quad \text{(Equation 3)}$$

β: Weight of identity loss $D_{id}$: Neural network constituting identity discriminator model FIG. 5 is a view showing a case in which a pair of a person background image and an utterance audio signal not matching each other is used as training data in a lip sync image generation device according to an embodiment of the present invention.

Figure 5:
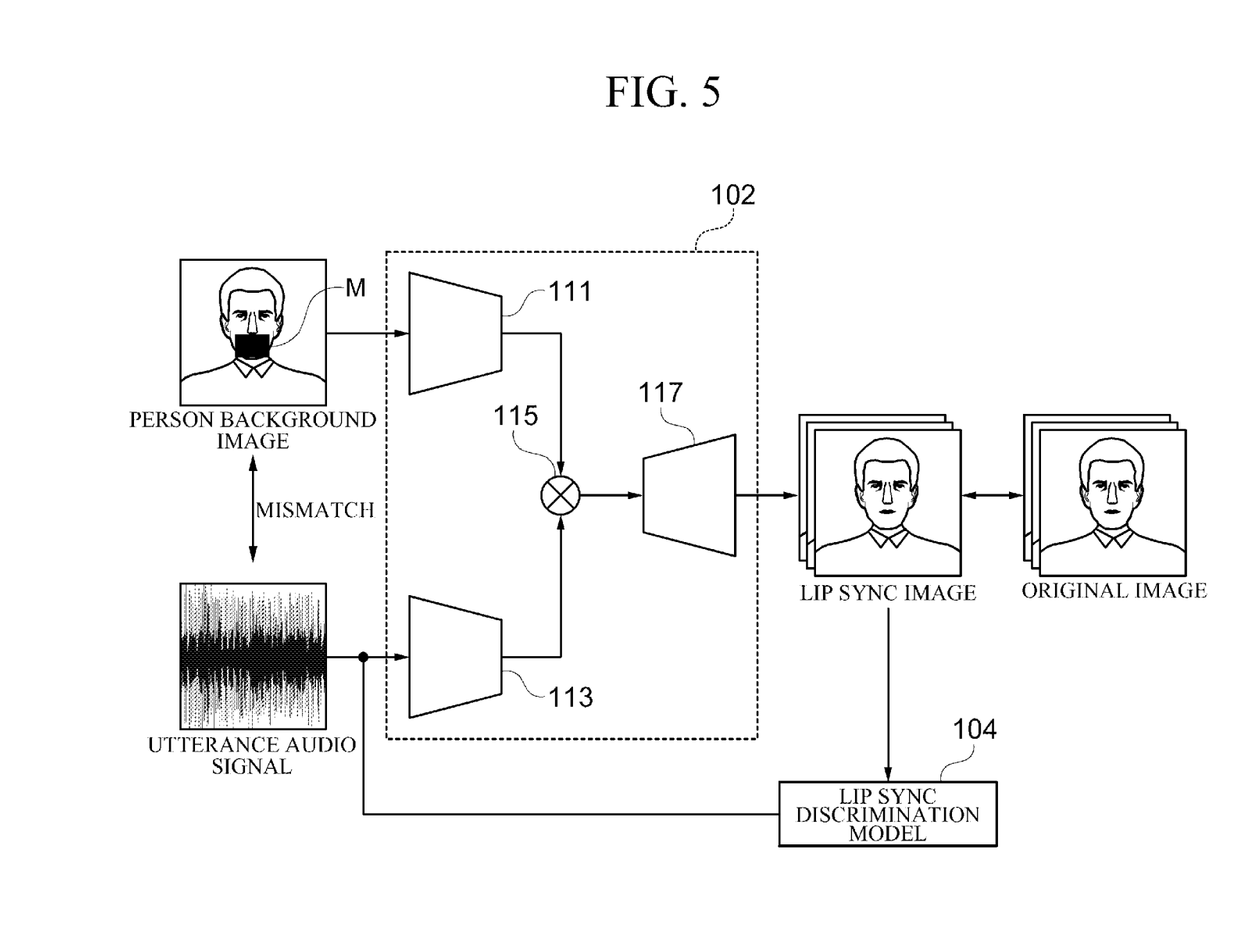
FIG. 5 is a view showing a case in which a pair of a person background image and an utterance audio signal not matching each other is used as training data in a lip sync image generation device according to an embodiment of the present invention.

Referring to FIG. 5, the person background image may be input to the first encoder 111, and the utterance audio signal not matching the person background image may be input to the second encoder 113. That is, the utterance audio signal may be the voice of a person different from a person in the person background image, or may be the voice of a person in the person background image, whose timing does not match the timing of the person background image.

When a person background image and an utterance audio signal not matching each other are input, the image synthesis model 102 may be trained to minimize the difference between a lip sync image and a portion not associated with an utterance in an original image (i.e., a portion not covered by the mask M in the person background image). At this time, the image synthesis model 102 may use partial reconstruction loss, which is the difference between the lip sync image and the portion not associated with an utterance in the original image, as a loss function for a corresponding neural network.

In addition, the lip sync discrimination model 104 may be provided to use an utterance audio signal (i.e., an utterance audio signal not matching the person background image) as an input and use the lip sync image output from the image synthesis model 102 as an input, in order to obtain the difference between the lip sync image and the utterance audio signal (i.e., the degree of mismatch). That is, the lip sync discrimination model 104 may use sync loss, which is the difference between the lip sync image and the utterance audio signal, as a loss function for a corresponding neural network.

Here, the lip sync image generation device 100 may use the sync loss of the lip sync discrimination model 104 as a main loss function, and may use the partial reconstruction loss of the image synthesis model 102 as an auxiliary loss function. At this time, a total loss function $L_{disagree}$ of the lip sync image generation device 100 may be represented by Equation 4 below.

$$L_{disagree} = \Sigma_{i,j} \{ -D_{sync}(G(S_i^{mask}, A_j), A_j) + \lambda_{disagree} \cdot \|M_i * S_i - M_i * G(S_i^{mask}, A_j)\| \} \quad \text{(Equation 4)}$$

$D_{sync}$: Neural network constituting lip sync discrimination model

G: Neural network constituting image synthesis model $S_i^{mask}$: Person background image in which portion associated with utterance is covered by mask $A_j$: Utterance audio signal not matching person background image $G(S_i^{mask}, A_j)$: Lip sync image output from image synthesis model $\lambda_{disagree}$: Weight between sync loss of lip sync discrimination model and partial reconstruction loss of image synthesis model $M_i$: Mask for covering portion associated with utterance in person background image

*: Operator for performing pixel-wise multiplication

In Equation 4, the first term of the right side is a term representing the sync loss of the lip sync discrimination model 104, and the second term of the right side is a term representing the partial reconstruction loss of the image synthesis model 102. In addition, $M_i$ may be a mask in which a portion associated with an utterance in the person background image has a pixel value of 0, and in which a portion not associated with an utterance therein has a pixel value of 1.

Figure 6:
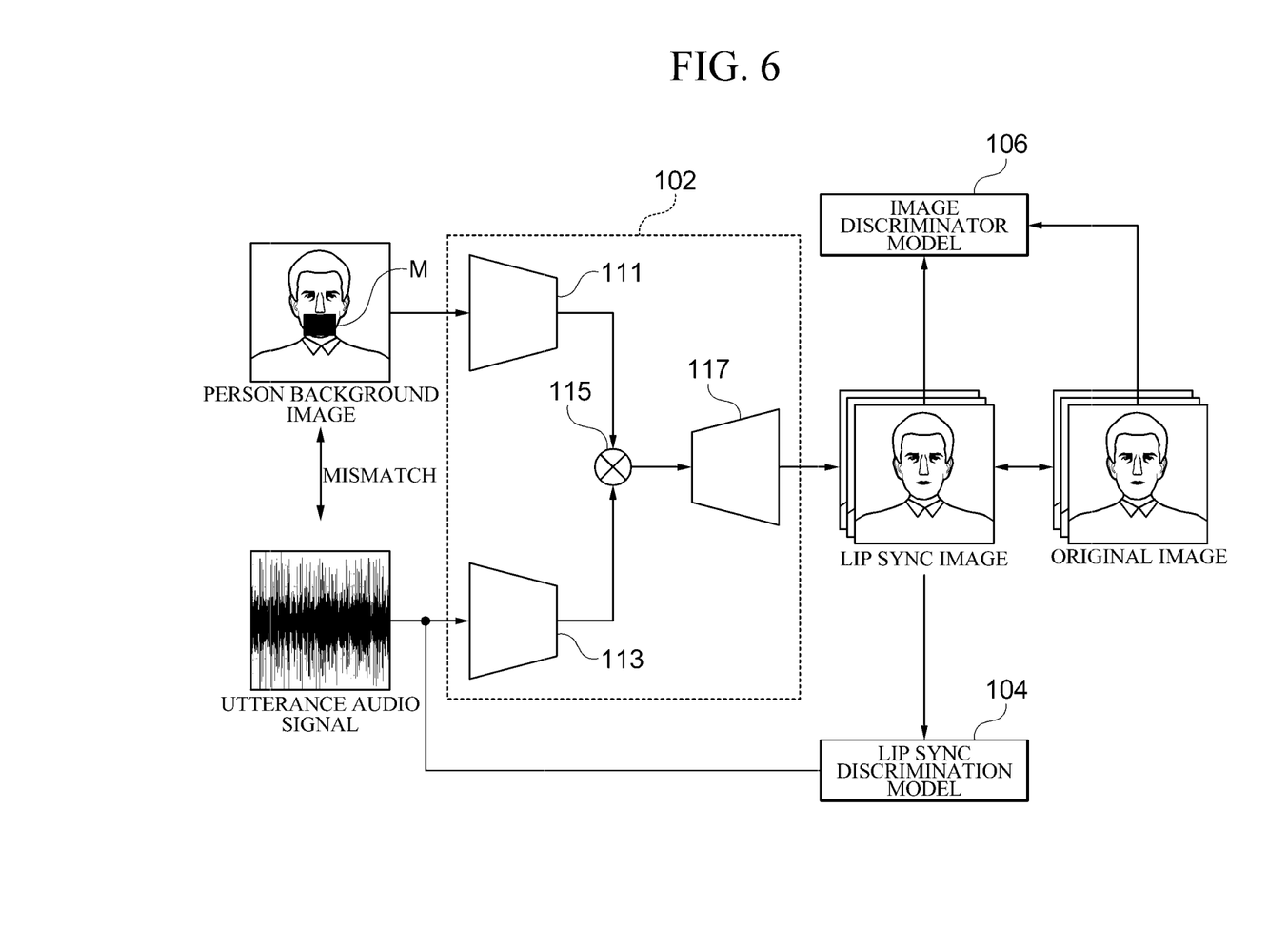
FIG. 6 is a view showing a state in which an image discriminator model is added in the lip sync image generation device of FIG. 5.

Meanwhile, as illustrated in FIG. 6, the lip sync image generation device 100 may further include an image discriminator model 106 for improving the realism and quality of the lip sync image output from the image synthesis model 102. Particularly, when it is a multi-speaker model, the identity discriminator model 108 may be added to reinforce the identity of the lip sync image. The image discriminator model 106 may be an artificial neural network model which is trained to classify the original image as True and classify the lip sync image output from the image synthesis model 102 as Fake.

The lip sync image generation device 100 may train the image discriminator model 106 to determine the lip sync image output from the image synthesis model 102 as True. In this case, the lip sync image generation device 100 may include an adversarial loss function which induces the image synthesis model 102 such that the image discriminator model 106 classifies the lip sync image output from the image synthesis model 102 as True.

At this time, a total loss function $L_{disagree}$ of the lip sync image generation device 100 may be represented by Equation 5 below.

$$L_{disagree} = \Sigma_{i,j} \{ -D_{sync}(G(S_i^{mask}, A_j), A_j) + \lambda_{disagree} \cdot \|M_i * S_i - M_i * G(S_i^{mask}, A_j)\| - \gamma \cdot D_{gan}(G(S_i^{mask}, A_j)) \} \quad \text{(Equation 5)}$$

γ: Weight of adversarial loss function $D_{gan}$: Neural network of image discriminator model In Equation 5, the first term of the right side is a term representing the sync loss of the lip sync discrimination model 104, the second term of the right side is a term representing the partial reconstruction loss of the image synthesis model 102, and the third term of the right side is a term representing the adversarial loss function by the image discriminator model 106.

Figure 7:
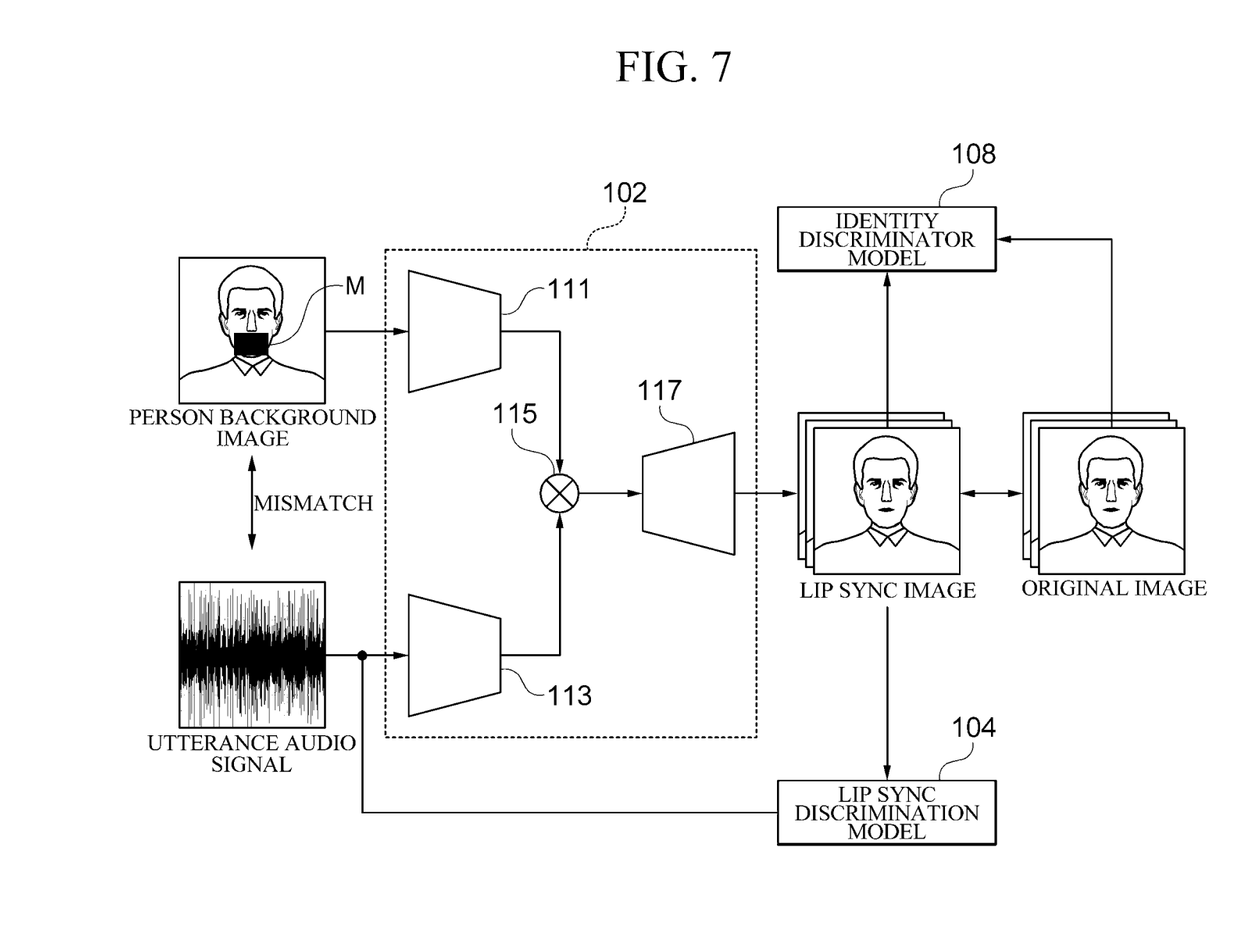
FIG. 7 is a view showing a state in which an identity discriminator model is added in the lip sync image generation device of FIG. 5.

In addition, as illustrated in FIG. 7, the lip sync image generation device 100 may further include an identity discriminator model 108 for reinforcing the identity of the lip sync image output from the image synthesis model 102. The identity discriminator model 108 may be an artificial neural network model for discriminating whether a person of the lip sync image output from the image synthesis model 102 and a person of the original image are the same person.

The identity discriminator model 108 may be provided to obtain the difference between the identity of the person in the lip sync image output from the image synthesis model 102 and the identity of the person in the original image. That is, the identity discriminator model 108 may use identity loss, which is the difference between the identity of the person in the lip sync image and the identity of the person in the original image, as a loss function of a corresponding neural network.

Figure 8:
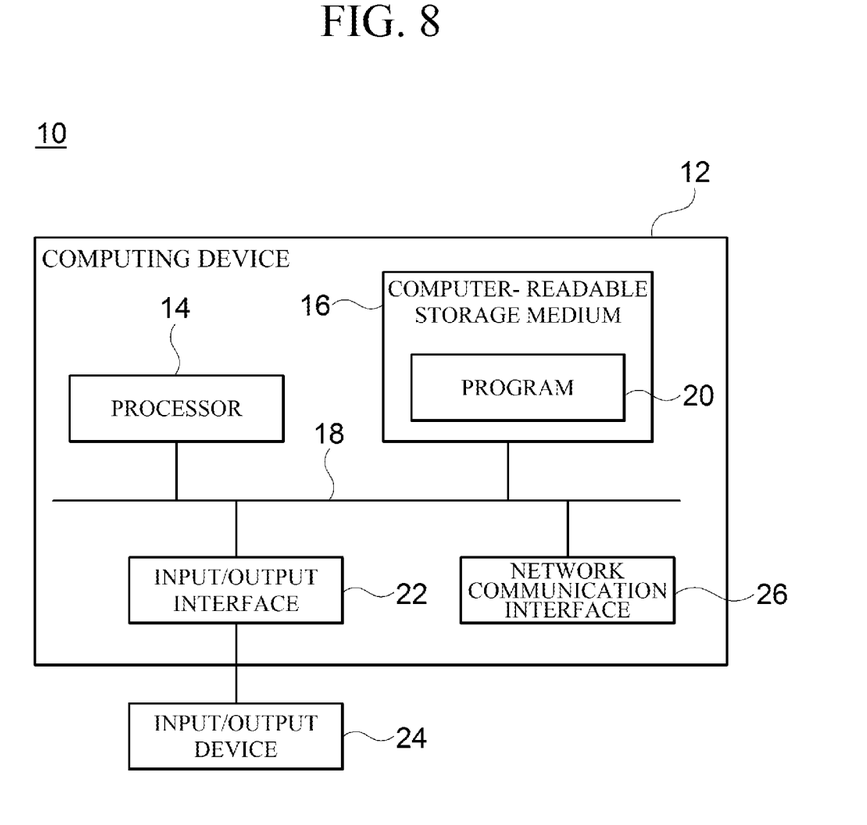
FIG. 8 is a block diagram for describing an example of a computing environment including a computing device suitable for being used in example embodiments.

The total loss function $L_{disagree}$ of the lip sync image generation device 100 may include the identity loss in addition to the sync loss and the partial reconstruction loss. This may be represented by Equation 6.

$$L_{disagree} = \Sigma_{i,j}\{-D_{sync}(G(S_i^{mask}, A_j), A_j) + \lambda_{disagree} \cdot \|M_i * S_i - M_i * G(S_i^{mask}, A_j)\| + \beta \cdot \|D_{id}(S_i) - D_{id}(G(S_i^{mask}, A_j))\|\}$$ (Equation 6)

β: Weight of identity loss $D_{id}$: Neural network constituting identity discriminator model FIG. 8 is a block diagram for describing an example of a computing environment 10 including a computing device suitable for being used in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the lip sync image generation device 100.

The computing device 12 includes at least one processor 14, a computer-readable storage medium 16, and a communication bus 18. The processor 14 may allow the computing device 12 to operate according to the example embodiment mentioned above. For example, the processor 14 may execute one or more programs stored in the computer-readable storage medium 16. The one or more programs may include one or more computer-executable commands, and when executed by the processor 14, the computer-executable command may be configured to allow the computing device 12 to perform operations according to the example embodiment.

The computer-readable storage medium 16 is configured to store computer-executable commands or program codes, program data, and/or other suitable types of information. A program 20 stored in the computer-readable storage medium 16 includes a set of commands executable by the processor 14. In one embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media accessible by the computing device 12 and capable of storing desired information, or any suitable combination thereof.

The communication bus 18 includes the processor 14 and the computer-readable storage medium 16 to interconnect various other components of the computing device 12.

The computing device 12 may also include one or more input/output interfaces 22 which provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or track pad), a keyboard, a touch input device (such as a touch pad or touch screen), a voice or sound input device, an input device such as various types of sensor devices and/or photographing devices, and/or an output device such as a display device, a printer, a speaker, and/or a network card. The exemplary input/output device 24 may be included inside the computing device 12 as one component constituting the computing device 12, or may be connected to the computing device 12 as a separate device distinct from the computing device 12.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A lip sync image generation device based on machine learning, the device comprising:
   an image synthesis model, which is an artificial neural network model, and which uses a person background image and an utterance audio signal as an input to generate a lip sync image; and
   a lip sync discrimination model, which is an artificial neural network model, and which discriminates the degree of match between the lip sync image generated by the image synthesis model and the utterance audio signal input to the image synthesis model,
   wherein when a pair of a person background image and an utterance audio signal matching each other is input to the image synthesis model, the lip sync image generation device uses reconstruction loss for minimizing the difference between the lip sync image output from the image synthesis model and an original image as a main loss function, and uses sync loss for minimizing the difference between the lip sync image and the utterance audio signal input to the image synthesis model in the lip sync discrimination model as an auxiliary loss function, and
   wherein a total loss function $L_{agree}$ of the lip sync image generation device is represented by the following equation:

$$L_{agree} = \Sigma_i \{\|S_i - G(S_i^{mask}, A_i)\| - \lambda_{agree} \cdot D_{sync}(G(S_i^{mask}, A_i), A_i)\}$$

where Si is Original image for i-th training data;
   G is Neural network constituting image synthesis model;
   $S_i^{mask}$ is Person background image in which portion associated with utterance is covered by mask;
   Ai is Utterance audio signal matching person background image;
   $G(S_i^{mask}, A_i)$ is Lip sync image output from image synthesis model;
   ‖A−B‖ is Function for obtaining difference between A and B;
   λagree is Weight between reconstruction loss of image synthesis model and sync loss of lip sync discrimination model; and
   Dsync is Neural network constituting lip sync discrimination model.

2. The lip sync image generation device of claim 1, wherein the lip sync image generation device is configured to perform training of the image synthesis model and the lip sync discrimination model by using different total loss functions respectively for a case in which a pair of a person background image and an utterance audio signal matching each other is used as training data and a case in which a pair of a person background image and an utterance audio signal not matching each other is used as training data.

3. The lip sync image generation device of claim 1, wherein the lip sync image generation device further comprises an image discriminator model, which is an artificial neural network model, and which classifies the original image as True and classifies the lip sync image as Fake, wherein the lip sync image generation device includes an adversarial loss function which induces the image synthesis model such that the image discriminator model classifies the lip sync image output from the image synthesis model as True.

4. The lip sync image generation device of claim 3, wherein a total loss function $L_{agree}$ of the lip sync image generation device is represented by the following equation:

$$L_{agree} = \Sigma_i \{\|S_i - G(S_i^{mask}, A_i)\| - \lambda_{agree} \cdot D_{sync}(G(S_i^{mask}, A_i), A_i) - \gamma \cdot D_{gan}(G(S_i^{mask}, A_i))\}$$

where $\gamma$ is Weight of adversarial loss function; and
$D_{gan}$ is Neural network of image discriminator model.

5. The lip sync image generation device of claim 1, wherein the lip sync image generation device further comprises an identity discriminator model, which is an artificial neural network model, and which discriminates whether a person of the lip sync image and a person in the original image are the same person, wherein the lip sync image generation device includes an identity loss for minimizing the difference between the identity of the person in the lip sync image and the identity of the person in the original image as a loss function.

6. The lip sync image generation device of claim 5, wherein a total loss function $L_{agree}$ of the lip sync image generation device is represented by the following equation:

$$L_{agree} = \Sigma_i \{\|S_i - G(S_i^{mask}, A_i)\| - \lambda_{agree} \cdot D_{sync}(G(S_i^{mask}, A_i), A_i) + \beta \cdot \|D_{id}(S_i) - D_{id}(G(S_i^{mask}, A_i))\|\}$$

where $\beta$ is Weight of identity loss; and
$D_{id}$ is Neural network constituting identity discriminator model.

7. A lip sync image generation device based on machine learning, the device comprising:
an image synthesis model, which is an artificial neural network model, and which uses a person background image and an utterance audio signal as an input to generate a lip sync image; and
a lip sync discrimination model, which is an artificial neural network model, and which discriminates the degree of match between the lip sync image generated by the image synthesis model and the utterance audio signal input to the image synthesis model,
wherein when a pair of a person background image and an utterance audio signal not matching each other is input to the image synthesis model, the lip sync image generation device uses sync loss for minimizing the difference between the lip sync image and the utterance audio signal input to the image synthesis model in the lip sync discrimination model as main loss function, and uses partial reconstruction loss for minimizing the difference between the lip sync image output from the image synthesis model and a portion not associated with an utterance in the original image as an auxiliary loss function.

8. The lip sync image generation device of claim 7, wherein a total loss function $L_{disagree}$ of the lip sync image generation device is represented by the following equation:

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\|\}$$

where $D_{sync}$: Neural network constituting lip sync discrimination model;
G is Neural network constituting image synthesis model;
$S_i^{mask}$ is Person background image in which portion associated with utterance is covered by mask;
$A_j$ is Utterance audio signal not matching person background image;
$G(S_i^{mask}, A_j)$ is Lip sync image output from image synthesis model;
$\lambda_{disagree}$ is Weight between sync loss of lip sync discrimination model and partial reconstruction loss of image synthesis model;
$M_i$ is Mask for covering portion associated with utterance in person background image; and
* is Operator for performing pixel-wise multiplication.

9. The lip sync image generation device of claim 8, wherein the lip sync image generation device further comprises an image discriminator model, which is an artificial neural network model, and which classifies the original image as True and classifies the lip sync image as Fake, wherein the lip sync image generation device includes an adversarial loss function which induces the image synthesis model such that the image discriminator model classifies the lip sync image output from the image synthesis model as True.

10. The lip sync image generation device of claim 9, wherein a total loss function $L_{disagree}$ of the lip sync image generation device is represented by the following equation:

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\| - \gamma \cdot D_{gan}(G(S_i^{mask}, A_j))\}$$

where $\gamma$ is Weight of adversarial loss function; and
$D_{gan}$ is Neural network of image discriminator model.

11. The lip sync image generation device of claim 8, wherein the lip sync image generation device further comprises an identity discriminator model, which is an artificial neural network model, and which discriminates whether a person of the lip sync image and a person in the original image are the same person, wherein the lip sync image generation device includes an identity loss for minimizing the difference between the identity of the person in the lip sync image and the identity of the person in the original image as a loss function.

12. The lip sync image generation device of claim 11, wherein a total loss function $L_{disagree}$ of the lip sync image generation device is represented by the following equation:

$$L_{disagree} = \Sigma_{i,j} \{-D_{sync}(G(S_i^{mask}, A_j), A_j) + \lambda_{disagree} \cdot \|M_i * S_i - M_i * G(S_i^{mask}, A_j)\| + \beta \cdot \|D_{id}(S_i) - D_{id}(G(S_i^{mask}, A_j))\|\}$$

where $\beta$ is Weight of identity loss; and
$D_{id}$ is Neural network constituting identity discriminator model.

13. A method for generating a lip sync image based on machine learning, which is a method performed in a computing device having one or more processors and a memory which stores one or more programs executed by the one or more processors, the method comprising:
inputting a person background image and an utterance audio signal to an image synthesis model to generate a lip sync image;

discriminating, through a lip sync discrimination model, the degree of match between the lip sync image generated by the image synthesis model and the utterance audio signal input to the image synthesis model; and performing training of the image synthesis model and the lip sync discrimination model by using different total loss functions respectively for a case in which a pair of a person background image and an utterance audio signal matching each other is used as training data and a case in which a pair of a person background image and an utterance audio signal not matching each other is used as training data, wherein when the pair of a person background image and an utterance audio signal not matching each other is input to the image synthesis model, the computing device uses sync loss for minimizing the difference between the lip sync image and the utterance audio signal input to the image synthesis model in the lip sync discrimination model as main loss function, and uses partial reconstruction loss for minimizing the difference between the lip sync image output from the image synthesis model and a portion not associated with an utterance in the original image as an auxiliary loss function.

* * * * *